United States Patent [19]
Dent

[11] Patent Number: 5,404,376
[45] Date of Patent: Apr. 4, 1995

[54] NAVIGATION ASSISTANCE FOR CALL HANDLING IN MOBILE TELEPHONE SYSTEMS

[75] Inventor: Paul W. Dent, Stehag, Sweden

[73] Assignee: Ericsson-GE Mobile Communications Inc., Research Triangle Park, N.C.

[21] Appl. No.: 118,179

[22] Filed: Sep. 9, 1993

[51] Int. Cl.⁶ .......................................... H04L 27/30
[52] U.S. Cl. .................................. 375/200; 342/450; 342/457
[58] Field of Search ...................... 375/1; 342/450, 457

[56] References Cited

U.S. PATENT DOCUMENTS

| | | | |
|---|---|---|---|
| 3,714,573 | 1/1973 | Grossman | 375/1 |
| 4,799,062 | 1/1990 | Sanderford, Jr. et al. | 342/450 |
| 4,891,650 | 1/1990 | Sheffer | 342/457 |
| 4,977,577 | 12/1990 | Arthur et al. | 375/1 |
| 5,109,390 | 4/1992 | Gilhousen et al. | 375/1 |
| 5,119,104 | 6/1992 | Heller | 375/1 |
| 5,157,408 | 10/1992 | Wagner et al. | 375/1 |
| 5,179,571 | 1/1993 | Schilling | 375/1 |
| 5,305,349 | 4/1994 | Dent | 375/1 |

Primary Examiner—Salvatore Cangialosi
Attorney, Agent, or Firm—Burns, Doane, Swecker & Mathis

[57] ABSTRACT

In a mobile radio telephone system employing TDMA or CDMA, mobile units often must determine the timing and appropriate power necessary for transmissions to a base station. Information broadcast by base stations allows the mobile station to approximate its distance from each base station based on an average signal strength received and thereby determine the coarse sector location. Broadcast information may include the mean radial distribution of signal strength versus distance. From the broadcast information, the mobile station determines the propagation loss for a transmission to the base station and the appropriate power level and timing for transmissions. Accordingly, the mobile station transmits signals to the base station at the determined signal timing and power level.

26 Claims, 3 Drawing Sheets

NAVIGATION ASSISTANCE FOR CALL HANDLING IN MOBILE TELEPHONE SYSTEMS

FIELD OF THE INVENTION

The present invention relates to the use of time-based multiple access methods such as Time Division Multiple Access (TDMA) and Code Division Multiple Access (CDMA) communications techniques in mobile cellular radiotelephone communication systems, and more particularly, to a scheme for controlling the transmitter power and timing of such transmissions in a mobile station.

BACKGROUND OF THE INVENTION

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as to maintain high quality service and avoid rising costs.

Throughout the world, one important step in cellular systems is to change from analog to digital transmission. Equally important is the choice of an effective digital transmission scheme for implementing the next generation of cellular technology. Furthermore, it is widely believed that the first generation of Personal Communication Networks (PCN), (employing low cost, pocket-size, cordless telephones that can be carried comfortably and used to make or receive calls in the home, office, street, car, etc.), would be provided by the cellular carriers using the next generation digital cellular system infrastructure and the cellular frequencies. The key feature demanded in these new systems is increased traffic capacity.

In mobile cellular radio telephone systems using time-based multiple access methods such as TDMA or CDMA, it is often necessary for mobile transmitters to employ an appropriate transmitter power dependent on their distances from the base station and the proper transmitter timing associated with their various propagation delays to the base station. Proper transmitter power selection maintains all mobile transmitter signals received at the base station at approximately the same level to avoid excessive level differences which can result in interference by stronger signals.

In a TDMA system, timing of the mobile transmitter signals is controlled as a function of distance from the base station to ensure that signals arrive at the base station in their correct, assigned time-slot, and do not overlap. In a CDMA system, timing is controlled to reduce the width of the timing uncertainty region over which the code-correlating receiver must search, particularly when the mobile station begins transmitting. In both types of systems, once a mobile station achieves duplex communication with a base station, information transmitted from the base station can continuously control the mobile station transmitter's power and timing.

In CDMA applications, power and timing accuracy are most difficult to maintain. Maintaining the correct power level is paramount when signals overlap in time and frequency. The signals may be separated at the receiver by correlating the received signals with the corresponding despreading codes if the differences in power levels are not substantial.

In a conventional CDMA receiver, the suppression of unwanted signals in the correlation process is limited by the so-called processing gain. If an unwanted signal exceeds a desired signal by an amount greater than the processing gain, the desired signal cannot be decoded.

In U.S. Pat. Nos. 5,151,919 and 5,218,619, both, entitled "CDMA Subtractive Demodulation" by the present inventor, systems are described in which all signals are decoded at a base station in the order of strongest to weakest signals. The stronger signals are subtracted from the composite signal after decoding and before demodulating the weaker signals. As a result, greater level differences can be tolerated when the receiver knows what signals are present and their signal strength ranking. However, even the innovative subtractive CDMA system has difficulty with the sudden, unexpected appearance of a new signal at an arbitrary signal level.

The present invention overcomes the problems of the prior art by employing a method whereby a mobile station can estimate the power and/or timing advance necessary to make a first transmission to a base station.

SUMMARY OF INVENTION

The present invention is a method and apparatus whereby information broadcast by base stations of a multiple access, spread spectrum communications system allows a mobile station to approximate its distance from respective base stations based on an average received signal strength and further allows a mobile station to estimate the characteristics necessary to make a transmission to a base station. In a basic embodiment, the broadcast information includes the mean radial distribution of signal strength versus distance, and is independent of its bearing direction. In a further embodiment, the fact that the radial distribution of signal strength may be different in different directions is accounted for and the base stations additionally broadcast information relating to different sectors.

A mobile station can determine within which coarse sector it is located in several ways. The mobile station can determine which surrounding base stations it can receive, or the base stations can illuminate different coarse sectors with different frequencies, or the base stations can broadcast a rotating signal strength pattern using a pair of phased antennas, the phase of the signal being relative to a marker in the broadcast data to allow the mobile station to determine its bearing.

The mobile station receives the base station signals, and measures and averages their respective signal strengths. After receiving the broadcast information from the base station, the mobile station determines the propagation loss of the transmission to the base station and thus the appropriate power to use in the reverse direction. Moreover, the mobile station can estimate distance from the base stations using the radial propagation law appropriate to the sector where the mobile is located. Consequently, the timing advance required for the mobile station transmission to be received at the base station at a desired time can be estimated.

Further, a mobile station can determine its sector and bearing more accurately by modulating the broadcast signal with a radio-navigation modulation method that varies according to the angle around the base station. For example, the base station broadcast signal can be radiated on two separate antennas with a continuously rotating relative phase difference to produce a rotating signal strength pattern. The phases selected are related by a timing mark in the data modulation so that the mobile station can determine its bearing relative to the base station. This technique of radio navigation is known as the CONSOL system.

Often base stations use a different power, cover a different radius cell, and have a different signal strength distribution within the cell with respect to one another. Consequently, the broadcast information must be adapted to each particular cell to enable the mobile station to determine its power and timing. Accordingly, a further embodiment of the invention eliminates the need to conduct the expensive signal-strength survey operation necessary to adapt the broadcast information to each cell. Rather, during conversations with a base station, the mobile stations report the signal strength they are receiving and the timing advance they are using. Therefore, a base station, knowing its own transmit ERP (Effective Radiated Power) and the time-of-arrival of the mobile's signal, can determine the distance to the mobile station and the relationship between signal strength and distance, as reported by different mobile stations over a period of time.

A further embodiment of the invention is implemented when the base stations are making CDMA transmissions. By correctly choosing the necessary parameters in a CDMA system, surrounding base stations can re-use the same frequencies. Advantages in system capacity including an increase in the number of simultaneous conversations per square kilometer per megahertz of spectrum that can be supported are realized. In a CDMA system, a mobile station can simultaneously receive broadcast information from adjacent base stations as well as its currently assigned base station. When all base stations on the same frequency have synchronized CDMA transmissions, a mobile station can determine its position from the relative timing of three different received base stations. The broadcast information from the base stations to the mobile stations can include absolute base station coordinates for determining the mobile station's absolute position or the broadcasting base station's range and bearing relative to a neighboring base station. This allows the mobile station to determine its relative position.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION OF THE PREFERRED EMBODIMENTS

Figure 1:
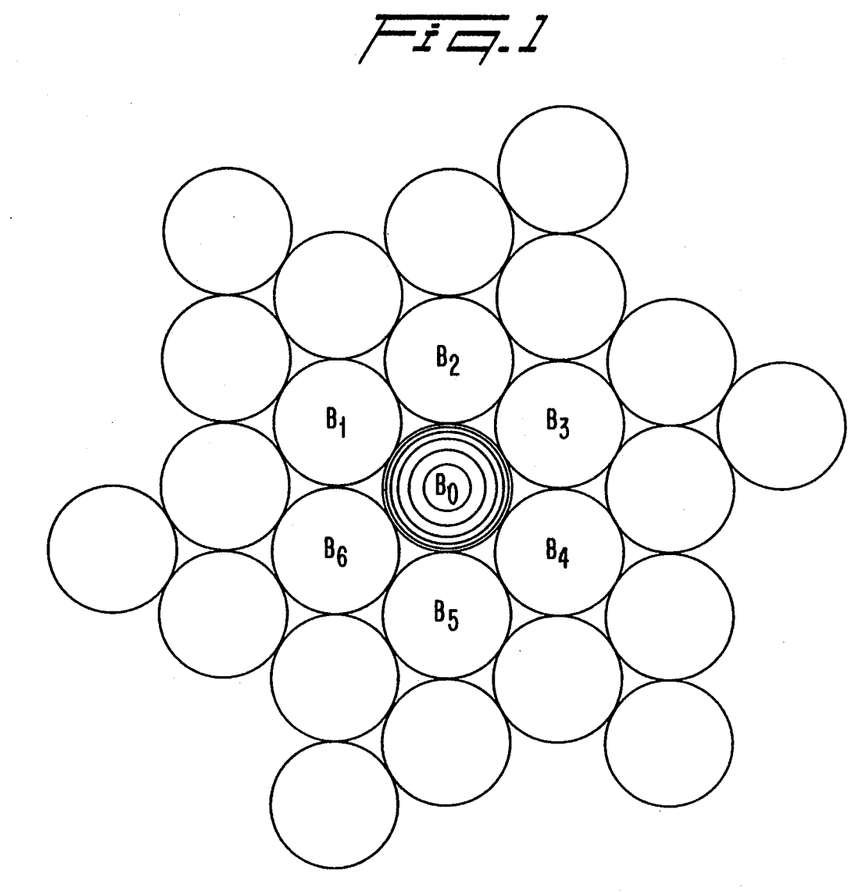
FIG. 1 is a cellular coverage pattern in an exemplary cellular phone system.

While the following description is in the context of cellular communications systems involving portable or mobile radio telephones and/or personal communication networks, it will be understood by those skilled in the art that the present invention may be applied to other communications applications. For example, the preferred implementation is described with respect to a CDMA system, however, the invention may be applied to avoid excessive signal level differences in FDMA or TDMA systems, which can otherwise lead to difficult specifications for receiver selectivity, or to the prediction of a timing advance for initial transmission in TDMA systems, FIG. 1 is a simplified cellular coverage pattern showing a cell $B_0$ covered by a base station surrounded by adjacent cells $B_1$ to $B_6$, each covered by their own respective base station. For purposes of illustration, a mobile station is assumed to be located in the cell $B_0$. For simplicity cells are shown as circles of equal size, but in practice the areas illuminated by different base station antennas can be sectors of a circle, ellipse, or a variety of irregular shapes.

The base stations transmit CDMA signals on the same frequency, but each base station uses different codes. The mobile station receiver decodes the CDMA signals by correlating known sequences with the codes of the base station responsible for the mobile station and each of the neighboring base stations, and listens to the broadcast channels of the neighboring base stations. Often it will be impossible for the mobile station to pick up the transmission of certain base stations. For example, a mobile station on the edge joining cells $B_1$ and $B_0$ will probably not receive transmissions from the base station in cell $B_4$. However, the mobile station would know that it is located in an area where it cannot receive that particular transmission and thus, would have an indication as to which of the six coarse sectors of cell $B_0$ it is located in.

The information broadcast from $B_0$ preferably includes a signal strength profile along the line joining $B_0$ to $B_1$ as well as signal strength profiles along the lines $B_0$–$B_2$, $B_0$–$B_3$ etc. The exact format of the signal strength profile information is not material. For example, the signal strength profile can be a list of expected signal strength values in dBm at equispaced distances from the cell center, or the delta between successive equispaced tings, or a list of distances for equispaced signal strengths, or coefficients such as a power of the radial distance for use in a formula that yields signal strength as a function of distance or vice-versa. Likewise, similar information is broadcast from the other cells. Thus, if the mobile can place itself in a sector spanning the line $B_0$–$B_1$ by virtue of receiving at least sometimes $B_0$ and sometimes $B_1$, then two alternative estimates of the distance along the line $B_0$–$B_1$ can be obtained, one with $B_0$ as the origin and one with $B_1$ as the origin. These two estimates are combined to obtain a further estimate to reduce uncertainty. If the mobile station can sometimes detect $B_2$ or $B_6$, then a further estimate of the position is made.

In a preferred embodiment, the base stations located in cells $B_0$–$B_6$ transmit with synchronized CDMA codes, so that when the mobile station receives two base stations simultaneously, or in quick succession, a timing difference is obtained from the correlating receiver which more accurately places the mobile station on a certain hyperbola. Occasionally, receiving a third station permits the mobile station to be precisely located using this hyperbolic navigation system.

Further information necessary to locate the mobile station, including the radial distances and beatings of each station from its neighbors, is broadcast on each base control channel. Therefore $B_0$ broadcasts the distance and beating of the lines $B_0$–$B_1$, $B_0$–$B_2$, $B_0$–$B_3$, etc., while $B_1$ broadcasts the distance and angle of the line $B_1$–$B_0$, $B_1$–$B_2$, $B_1$–$B_6$ among others. To assist the mobile's calculations, distances are described in delay terms in units of CDMA chip periods instead of miles or kilometers, The mobile station uses its estimated position and the base station's given position to determine the distance to the base station in units of CDMA chip periods. The appropriate time advance is then determined for the mobile station's first transmission to a base station by twice the one-way propagation time relative to a timing reference derived from the received base station signal, resulting in the signal being received back at the base station with approximately the same time alignment as the outgoing signals, there being no more than a nominal difference in time alignment.

For example, the base station broadcast information may provide for each angular sector, a table such as Table 1:

TABLE 1

| IF MOBILE RECEIVES THIS SIGNAL STRENGTH: | THEN MOBILE PROBABLY LIES AT THIS DISTANCE |
| --- | --- |
| −40dBm | 300 meters |
| −50dBm | 800 meters |
| −60dBm | 2315 meters |
| −70dBm | 5240 meters |
| −80dBm | 8771 meters |
| −90dBm | 14308 meters |
| −100dBm | 23580 meters |
| −110dBm | 40980 meters |
| −120dBm | 65000 meters |

The mobile station can then use the measured signal strength value to interpolate between table entries to obtain an estimate of the distance. The mobile then knows the round trip propagation delay corresponding to traversing twice this distance at the speed of light. Thus, the mobile can calculate how much to advance its transmit signal timing relative to the signal received from the base station so that the return signal arrives back at the base station with the desired timing relationship. In practice, the mobile may be saved a great deal of calculation by broadcasting the distance information already scaled in units of timing advance, for example in units of $\frac{1}{4}$ of a chip.

This is the crudest example of a position determining system, and can suffer from the actual curve of the signal strength versus distance not being monotonic due to terrain irregularities or shadowing. To reduce anomalies and enhance performance, distance estimates from several receivable base stations can be employed. If no neighboring base stations can be received, it is likely that the mobile lies proximate to the center of the cell from it which it can receive transmission. Further known methods of enhancing the accuracy of crude navigation systems employ Kalman filters. These account for the mobile's limited ability to change position or velocity instantaneously by applying a smoothing to the estimated position, which prevents instantaneous position or velocity changes and permits only reasonable accelerations less than, for example, 0.2 g.

Further enhancements could include synchronizing the CDMA transmissions from the base stations so that the mobile could determine relative time-of-arrival of the respective signals and thus the delta distance. This forms the hyperbolic navigation system since the locus of possible mobile positions with a given delta distance from two bases is a hyperbola. There is also the CONSOL type bearing determination system which can be used, in which the base station transmits a signal from an antenna array phased such that the signal the mobile receives has a varying feature around 360 degrees of beating from the base. By measuring this feature, the mobile determines its bearing. Determining bearing from two stations thus locates the mobile. The base station broadcast information should include station coordinates for use in such calculations.

For example in a TDMA system, different mobiles are allocated different time slots in the uplink and downlink directions. Signals for a first mobile may be located in a first time slot transmitted in the downlink while signals for a second mobile are located in a second time slot immediately following the first time slot and so on. In contrast, in the uplink the first mobile transmits on the second time slot, the second mobile on a third time slot, etc. The first mobile receives the first time slot and transmits during the second time slot so that the mobile does not have to transmit and receive at the same time.

Because the mobiles are located at varying distances from the base station, signals transmitted from the base station are received with different time delays. Therefore, if after receiving, the mobiles turn around and transmit, the transmitted signals will be received at the base station with a one time slot offset plus the there-and-back delay. Thus, it is possible for signals received from a distant mobile to be delayed so much that they overlap and interfere with a signal from a nearby mobile in the next time slot. Accordingly, TDMA mobiles can advance their transmit timing by twice the loop propagation delay so that their transmissions arrive in the correct time slot. To ensure that transmit timing does not encroach into the receive timing, the entire uplink slotting format is offset from the downlink slotting format by slightly more than one time slot, i.e. by an amount corresponding to the maximum timing advance a mobile may have to apply when at maximum range.

In CDMA systems, the transmission formats are not necessarily divided into time slots. Typically, the mobile signals are deliberately permitted to overlap. However, avoiding excessive relative delay between different mobile signals is still important for several reasons. First, it may be desirable to use orthogonal spreading codes for different mobiles. Orthogonal spreading codes have zero correlation between each other. Thus, mobiles using these codes do not interfere with each other even though they are overlapping in time and frequency. However, orthogonality can only be maintained when the code words are aligned exactly on top of each other. Orthogonality may be lost if the codes have a relative shift of one chip or more. Thus, it would be desirable to time advance the transmissions of mobiles according to their distance away from the base station so that their orthogonal CDMA codes are received exactly on top of each other to a fraction of a chip accuracy. This can be achieved with a feedback loop whereby the base station includes a bit in the downlink transmission which periodically indicates that a small advance or lag is appropriate once two-way conversation has been established. One of the objects of the present invention is to get reasonably close to the proper timing prior to call set up and before two-way conversation is established. This is desirable because it is also more difficult for the base station to detect a call from a CDMA mobile if it does not know what code alignment to use for despreading the CDMA signal. The base station will search for a mobile call using various shifts of the correlating codes in steps of one chip. But, if the chips are only 0.8 microseconds long and delay uncertainty due to distances from 0-30 kilometers is 0-200 microseconds for example, it is difficult to search with 250 correlation code shifts. Therefore it is desirable to preset the mobiles transmit timing prior to call set up to reduce the timing uncertainty that the base station encounters.

Figure 2:
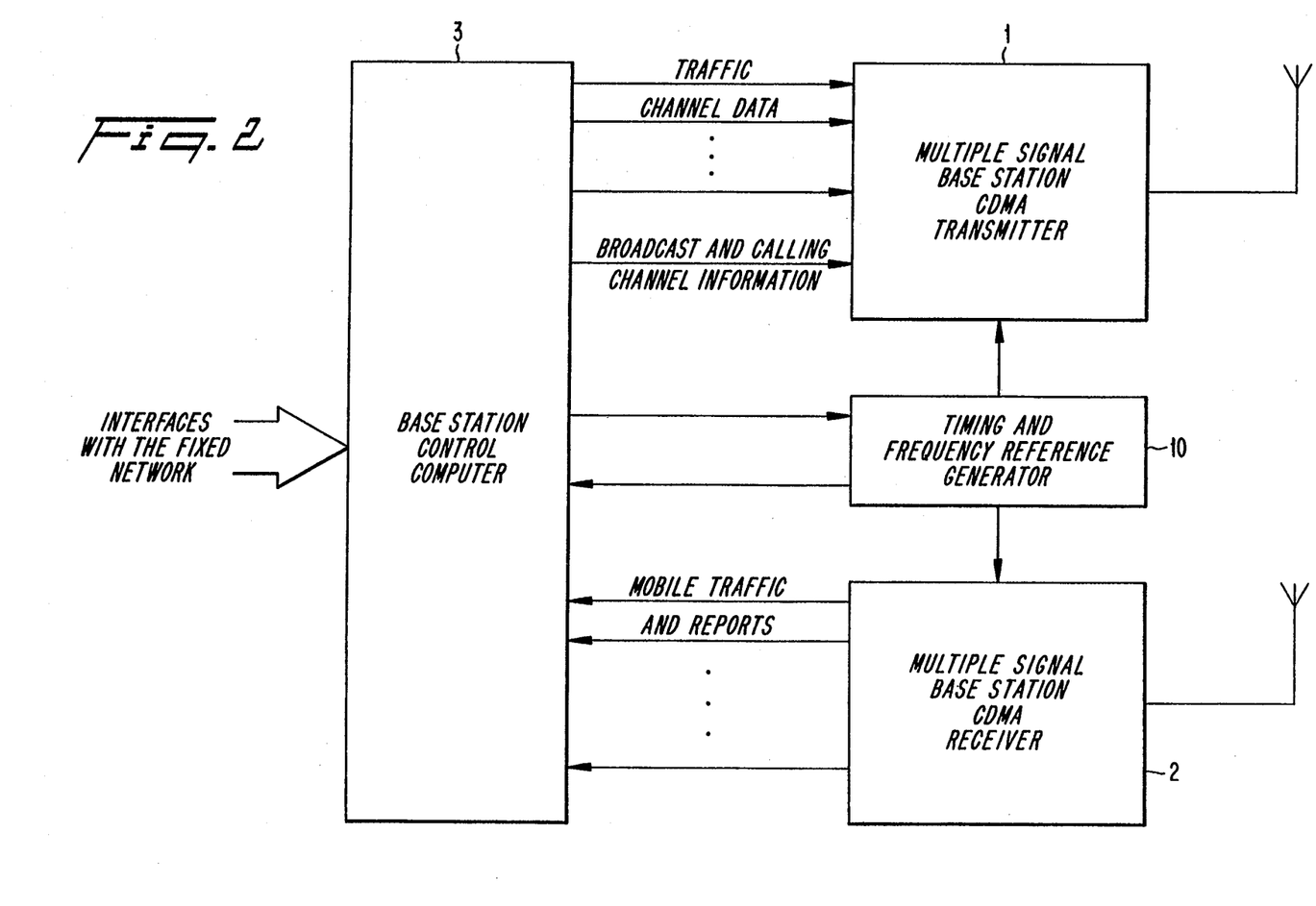
FIG. 2 is a block diagram of a base station according to the present invention.

A preferred embodiment of the invention will now be described with the aid of FIGS. 2 and 3 which respectively show the block diagrams of a suitable base and mobile station. In FIG. 2 there is shown a base station CDMA transmitter 1 that transmits multiple, overlapping signals on the same frequency using different codes. Some signals are traffic carrying channels which carry coded speech signals to different mobiles, At least one of the overlapping signals is a broadcast and calling channel that broadcasts some information to all mobiles, and also addresses certain calls to specific mobiles by including a mobile ID code or telephone number in the message. A control computer 3 provides the CDMA transmitter 1 with the broadcast information for the mobile stations relating to the position estimating function. The following information is included on the broadcast channel: (i) distance in units of CDMA chip periods to each neighboring base station; (ii) bearing in units of $\pi/128$ to each neighboring base station; (iii) CDMA code in use at each neighboring base station; (iv) base station transmitter power in units of dBW; and (v) mean signal strength expected at a mobile station receiver with 0 dB antenna gain at various points along the line to each neighboring base station in steps of one CDMA chip period delay, the signal strength being coded in terms of the delta-dBs between each successive point with the first value being an absolute value in dBm.

The base station control computer 3 collects information from the mobile stations via CDMA receiver 2, thereby allowing control computer 3 to derive and continuously update the broadcast information. The broadcast information is transmitted to the base station by the mobile station during an ongoing traffic conversation using a channel called the associated control channel (ACCH) that is multiplexed with traffic information. The information transmitted by the mobile stations includes: (i) the mobile station transmitter power level in use; (ii) the mobile station timing advance currently in use in chip periods; (iii) the signal strength in dBm currently being received from the base station through which the current conversation is being maintained; (iv) the mean signal strength received (i.e. over the last two seconds) from all surrounding base stations on the same frequency whose calling channel has recently (i.e., within the previous two seconds) been successfully demodulated; and (v) the relative delay between signals received from the other base stations and the currently assigned base station in CDMA chip periods.

The control computer 3 processes all the above information in a coarse position determining program to determine the position of the mobile station. The signal strength reported by the mobile station at the determined position is averaged with all previous reports from other mobile stations that approximately indicated the same position to develop a signal strength map within the cell. The average signal strength map thereby provides the information that the base station needs to broadcast.

Figure 3:
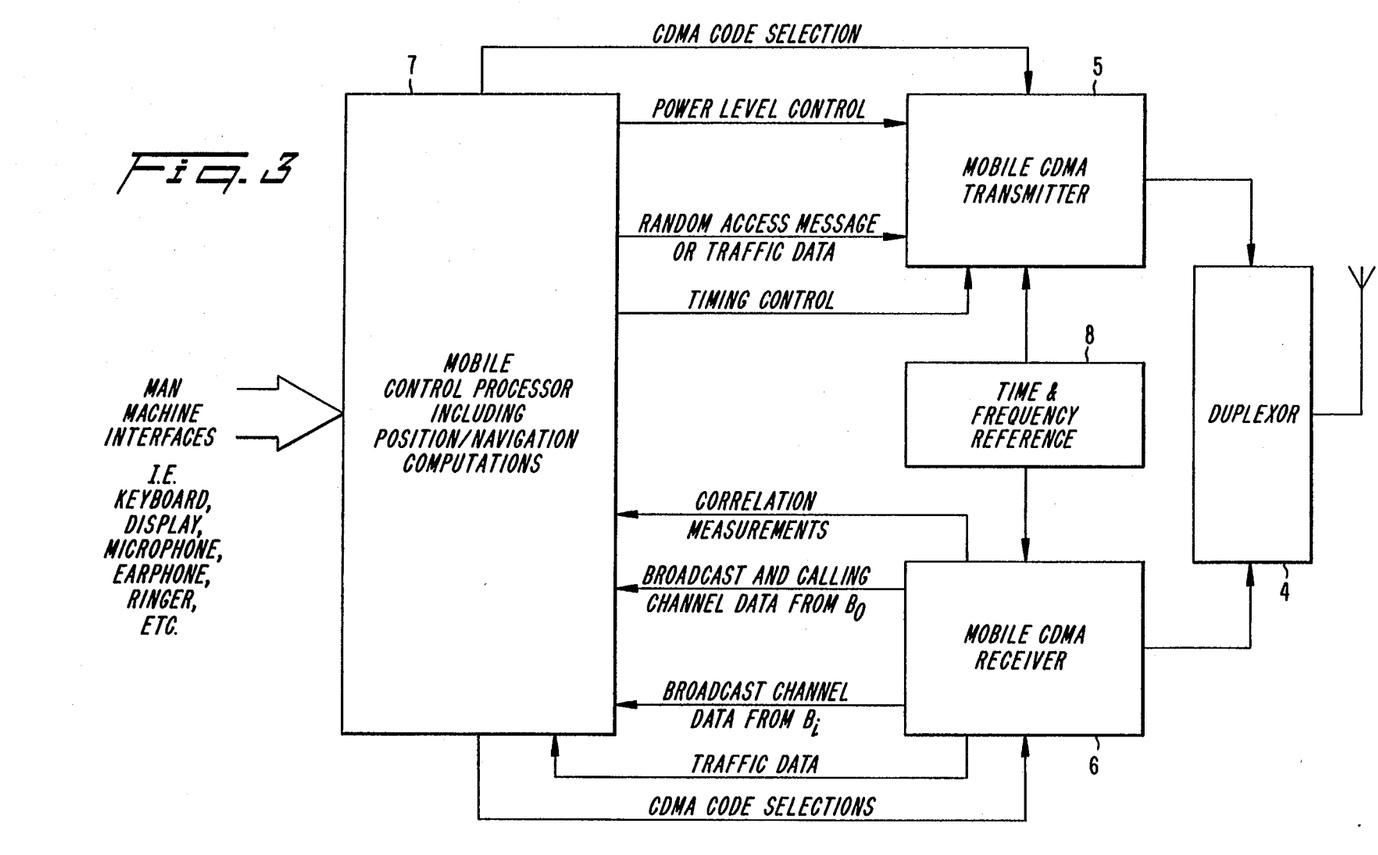
FIG. 3 is a block diagram of a mobile station according to the present invention.

The mobile station block diagram for a preferred embodiment is shown in FIG. 3. A mobile station CDMA transmitter 5 and mobile station CDMA receiver 6 operate with a fixed frequency offset, so that they can be connected to the same mobile antenna using a duplexor 4. The CDMA transmitter 5 in the mobile station only transmits one CDMA coded signal. In contrast, the base station CDMA transmitter 1 transmits using many different codes. The code used by the mobile station transmitter 5 is indicated by the mobile station control processor 7. The mobile station CDMA receiver 6 however, is able to correlate with many different codes provided by the control processor 7, and thus, demodulates many overlapping CDMA signals together. The demodulation technique employed is preferably subtractive CDMA demodulation in conjunction with scrambled Walsh-Hadamard orthogonal coding, as described in the aforementioned U.S. Pat. Nos. 5,151,919 and 5,218,619, but any CDMA receiver capable of demodulating several overlapping signals can be used.

Further, a technique known as RAKE reception is also used, for example as described in co-pending allowed application Ser. No. 857,433, entitled "Diversity RAKE Receiver". With a RAKE receiver correlation is performed with different time shifts of the input signal samples to account for timing uncertainties and echoes, and the correlated results are combined by either coherent or non-coherent weighting. The results of correlating with different time shifts are also sent to the control processor 7 to determine time-of-arrival differences between different signals.

The signals demodulated by the mobile station include the broadcast channel of the cell where the mobile station is located and the broadcast channels of any neighboring cells that are received strongly, i.e. that exceed a certain threshold. When a conversation is established with the base station, the mobile station receiver 6 also demodulates a traffic bearing CDMA signal transmitted by the base station and the mobile station transmitter is modulated with traffic signals such as digitized, coded speech.

The mobile station receives various data on the broadcast channel of its assigned base station. As a result, the mobile station estimates its distance from the base station in time delay units of CDMA chip periods from the mean received signal strength. The instantaneous signal strength indication is provided from the CDMA receiver 2 to the control computer 3 in the form of correlation measurements on different time shifts of the received signal. The control computer 3 combines the energy in the correlation measurements and computes a moving average of the total energy.

The broadcast channel from the base station is preferably organized in a time-multiplex format of 16 message slots each of 20 mS duration, the cycle repeating every 320 mS. When the network calls a mobile station, the call is sent in one time slot according to, for example, the last digit or digits of the mobile telephone number or ID code. During the remaining time slots, the mobile station can "sleep" and conserve battery power for 15/16ths of the time and only awaken to capture data in an assigned time slot. The mobile stations that may be called in a particular time slot are collectively referred to as a "sleep-mode group". In general, the mobile stations in a sleep-mode group are not necessarily related by telephone number, rather each is related by a separately programmed-in code.

Depending on the broadcast channel format, the mobile stations may awaken in another time slot in which the information relating to position estimation is broadcast. In a preferred embodiment, this information is broadcast in the idle time between network-originated calls to mobile stations. All base stations are preferably synchronized so that this information is broadcast simultaneously. This prevents the mobile station from having to awaken in additional time slots to receive adjacent base stations.

The mobile station control processor 7 receives from CDMA receiver 6 signal strength and relative timing measurements from all adjacent base stations that can be detected, as well as broadcast information providing relative distances and bearings between the adjacent base stations and expected signal strength profiles along radial directions to adjacent base stations.

The mobile station control processor 7 processes all the above information in a position-finding or navigation program. The program includes different modes which are operative based on whether adjacent bases can be heard. In one mode, no adjacent base stations can be heard, thus the navigation program must estimate the distance from its assigned base station solely on the signal strength received. It is possible that the sector where the mobile station is located can be determined based on past history. For example, if the mobile station moves into the current cell $B_0$, having previously been locked to $B_1$, then it is assumed that the mobile station is in the sector straddling the line $B_0$–$B_1$. If no adjacent base station can be heard, then the navigation program assumes the mobile is within 70% of the cell maximum radius and proceeds to use broadcast signal strength versus distance information to further estimate the mobile station's location.

In another mode, at least one adjacent base station can be heard. The distance from both base stations can be estimated from the signal strength while the difference in distance between the base stations can be estimated based on the timing difference between the received signals. This provides a more accurate estimate of the distance of the mobile station from its own cell center. If three bases or more can be heard, the mobile is position-located by hyperbolic navigation calculations.

The accuracy of the position estimating program is improved by accounting for the limited velocity of the mobile station. The known technique of Kalman filtering for example, can be used to maintain the estimate of position and velocity of the mobile station.

The Kalman technique operates in the following manner: (1) using a past position and velocity estimate where the mobile station position is extrapolated to obtain a new position estimate; (2) using information broadcast from the base stations, where the signal strength that should be received from different base stations and the timing differential are predicted; (3) actual signal strength and timing differential measurements are compared with the estimates, and the position and velocity estimates are updated accordingly.

Once an estimate of the distance to the base station is obtained, the mobile station uses an appropriate time advance corresponding to twice the propagation delay over this distance when transmitting a signal to the base station for the first time. The control processor 7 provides the timing advance to the CDMA transmitter 5.

The mobile station may also use a power level for first contact dependent on the average signal strength received. The underlying assumption is that the mean propagation loss from the mobile station transmitter to the base station receiver is the same as the mean propagation loss in the other direction. Thus, if the base transmit power and the received signal strength are known, the mobile transmit power for a desired receive signal strength at the base can be computed.

The base station broadcast information will if necessary contain information on the ERP of the broadcast signal. By relating the received signal strength to the ERP, the mobile determines the propagation loss in the downlink direction. The mobile then assumes that the propagation loss is identical in the uplink direction, unless the base station has broadcast information indicating that its receive antenna gain differs from its transmit antenna gain, known as talk-out/talk-in difference. In this case, the mobile uses this factor to convert the downlink propagation loss to an uplink propagation loss estimate.

Random access messages are sent from the mobile station to the base station at the computed power level and timing. The principle information in the random access message is the mobile station identification number. When the base station replies with a message addressed to the same mobile station identification number, the random access procedure is largely complete. The message from the base station may command the mobile station to switch to a different radio frequency and code for maintaining the present call. Upon establishing duplex contact, the mobile station reports the information on received signal strengths and timings to the base station as described above. The base station control processor 3 processes this information to update the signal strength map within the cell.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a multiple access, spread spectrum communications system, a method for establishing communications between a mobile station and at least one base station, said method including the steps of:
   broadcasting a signal to said mobile station from at least one base station wherein the broadcast signal from said at least one base station includes data;
   receiving at said mobile station the broadcast signal of said at least one base station;
   determining a mean signal strength for said received broadcast signal; and
   estimating a distance between the mobile station and said at least one base station based on said data and said mean signal strength of said received broadcast signal.

2. A method according to claim 1, further including the steps of:
   determining an initial transmit power level to be used by said mobile station in initiating transmission to said at least one base station using said estimated distance.

3. A method according to claim 2, further including the steps of:
   determining signal transmission timing based on a timing reference in said data of the broadcast signal and said estimated distance; and transmitting a signal from said mobile station to said at least one base station in accordance with the determined signal transmission timing.

4. A method according to claim 2, wherein said data in said broadcast signal includes signal strengths at varying distances from said at least one base station.

5. A method according to claim 4, wherein said data in said broadcast signal further includes at least one of distance and propagation time delay from said at least one base station to neighboring base stations.

6. A method according to claim 5, wherein said data in said broadcast signal further includes bearing from said at least one base station to said neighboring base stations.

7. A method according to claim 6, wherein said data in said broadcast signal further includes an absolute position of said at least one base station and an identifier code to uniquely identify said at least one base station.

8. A method according to claim 2, further including the step of reporting from said mobile station to said at least one base station the estimated distance between said at least one base station and said mobile station and the mean signal strength received by said mobile station.

9. A method according to claim 8, further including the steps of:
    determining signal transmission timing based on a timing reference in said data of the broadcast signal and said estimated distance; and
    reporting from said mobile station to said at least one base station the determined signal transmission timing.

10. A method according to claim 9, further including the step of determining at said at least one base station signal strengths of said at least one base station at different distances by averaging a previous signal strength report from other mobile stations at similar distances from said at least one base station.

11. A method according to claim 10, further including:
    reporting from other mobile stations an estimated distance between said other mobile stations and said at least one base station;
    identifying each other mobile station at a similar distance from said at least one base station with the reported estimated distances.

12. A method according to claim 11, wherein other base stations have a timing reference in common with said at least one base station.

13. A method according to claim 12, further including the steps of:
    reporting from said other base stations to said at least one base station time of arrival of the mobile station signal relative to the timing reference of said at least one base station over a radio link or landline network; and
    identifying said other mobile stations at distances from said at least one base station using the time of arrival reports and reported estimated distances.

14. In a multiple access, spread spectrum communications system, a method for establishing communications between a mobile station and a base station including the steps of:
    broadcasting a signal to said mobile station from a first base station wherein said first base station broadcast signal includes first information containing a signal strength profile at different distances from said first base station in a broad direction of a second base station;
    broadcasting a signal to said mobile station from said second base station wherein said second base station broadcast signal includes second information containing a signal strength profile at different distances from said second base station in a broad direction of said first base station;
    measuring mean signal strengths of said first base station broadcast signal and said second base station broadcast signal;
    determining whether a bearing of the mobile station from said first base station is in a broad direction of said second base station based on said first information, said second information, and the measured mean signal strengths; and
    estimating a distance from said mobile station to said first base station using said first base station signal strength profile if the bearing is in the broad direction of the second base station.

15. A method according to claim 14, wherein said first information includes a unique identifier code to identify said second base station.

16. In a multiple access, spread spectrum communications system, a method for establishing communications between a mobile station and a base station assigned to said mobile station including the steps of:
    receiving at the mobile station broadcast signals from the assigned base station;
    measuring a received signal strength of the broadcast signals;
    estimating a position of the mobile station based on the received signal strength; and
    determining an appropriate timing advance for signal transmission from the mobile station to the assigned base station according to the estimated position.

17. A method according to claim 16, further including the steps of:
    receiving broadcast signals from at least one neighboring base station; and
    measuring timing differences between the broadcast signals received from said at least one neighboring base station wherein said step of estimating the position of the mobile station is further based on the measured timing differences.

18. A method according to claim 17, wherein said broadcast signals from said at least one neighboring base station include a signal strength profile along a line connecting the assigned base station with said at least one neighboring base station.

19. A method according to claim 18, further including the step of receiving broadcast signals from a first neighboring base station and a second neighboring base station including radial distances and bearings between said first neighboring base station and said second neighboring base station, said first neighboring base station being adjacent to said second neighboring base station.

20. A method according to claim 18, wherein said broadcast signals received by the mobile station are synchronized transmissions from said assigned base station and said at least one neighboring base station.

21. A method according to claim 16, wherein said step of estimating position further includes the step of estimating velocity of the mobile station.

22. A method according to claim 21, wherein the estimated velocity is determined using a Kalman filtering technique.

23. A method according to claim 16, wherein said timing advance corresponds to twice a propagation delay over a distance from the mobile station to the assigned base station.

24. In a multiple access, spread spectrum communications system, a method for establishing communications between a mobile station and a base station assigned to said mobile station including the steps of:

broadcasting signals from neighboring base stations and the assigned base station, said broadcast signals including bearing information;

receiving the broadcast signals at said mobile station;

calculating a bearing of said assigned base station and said neighboring base stations with respect to the mobile station based on the broadcast signals;

estimating distance from the mobile station to the assigned base station and a signal timing for transmitting a signal from said mobile station to said assigned base station according to said calculated bearings; and transmitting said signal from said mobile station to said assigned base station with said estimated signal timing.

25. A method according to claim 24, wherein said step of estimating further includes determining a propagation delay from said mobile station to said assigned base station wherein said signal timing is approximately twice said propagation delay.

26. A method according to claim 25, wherein said broadcasting signals are broadcast using phased antennas.

* * * * *

UNITED STATES PATENT AND TRADEMARK OFFICE
CERTIFICATE OF CORRECTION

PATENT NO.   :   5,404,376

DATED   :   April 4, 1995

INVENTOR(S)   :   Paul W. Dent

It is certified that error appears in the above-identified patent and that said Letters Patent is hereby corrected as shown below:

Column 12, line 12, please change --beating-- to --bearing--.

Column 13, line 13, please change --beating-- to --bearing--.

Signed and Sealed this

Sixteenth Day of April, 1996

Attest:

BRUCE LEHMAN

*Attesting Officer*    *Commissioner of Patents and Trademarks*